United States Patent Office 3,454,990
Patented July 15, 1969

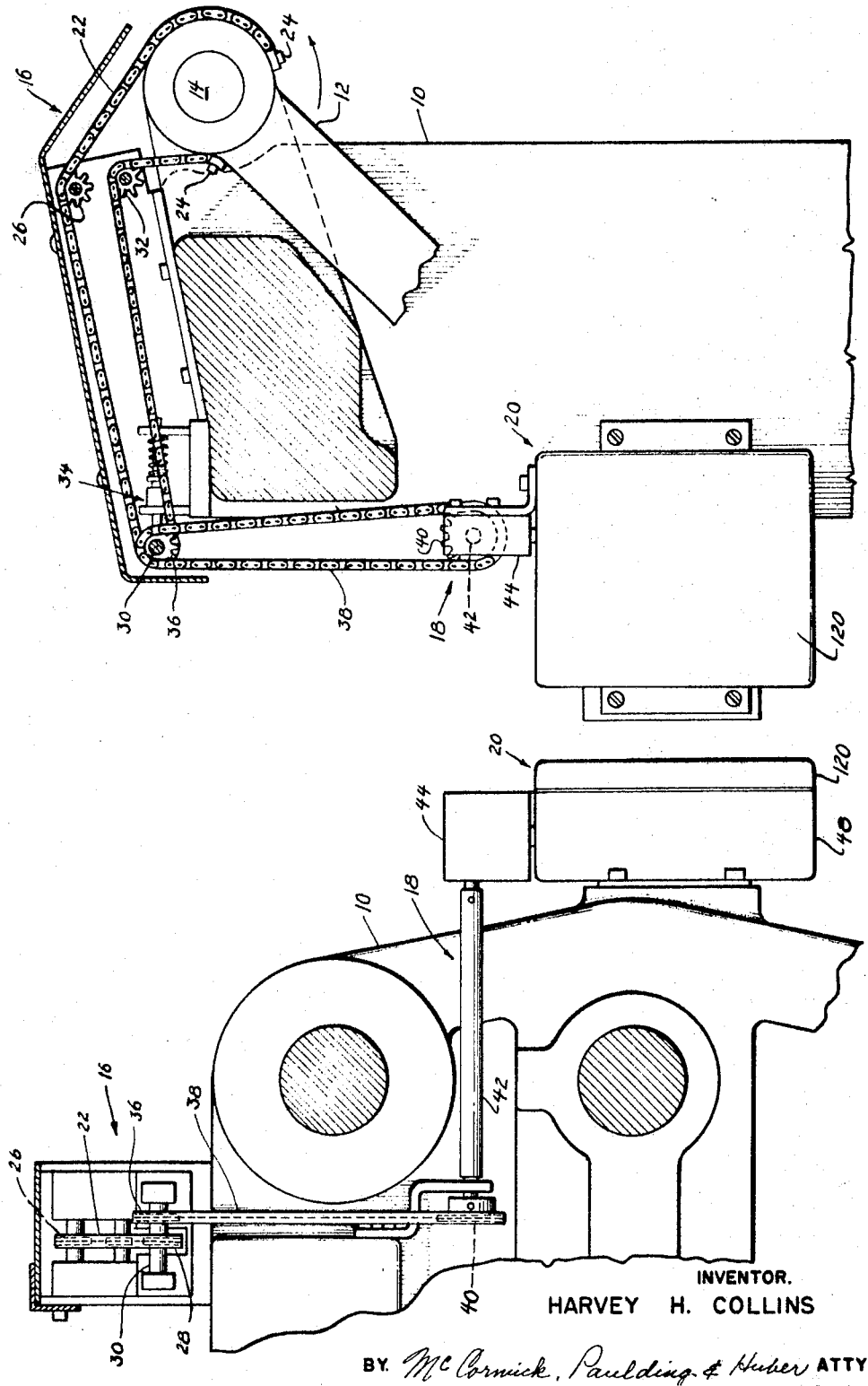

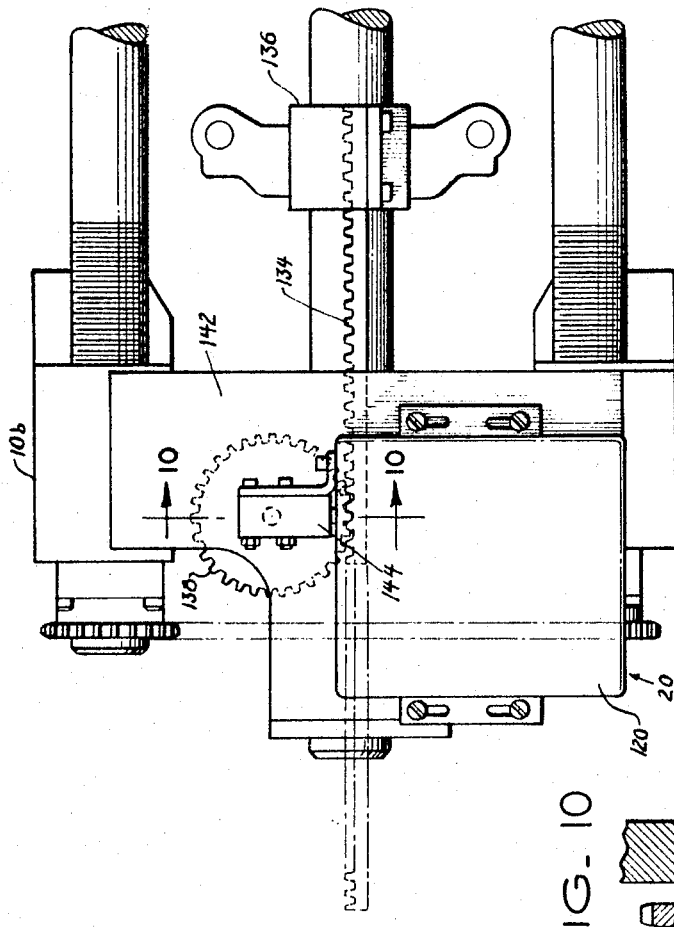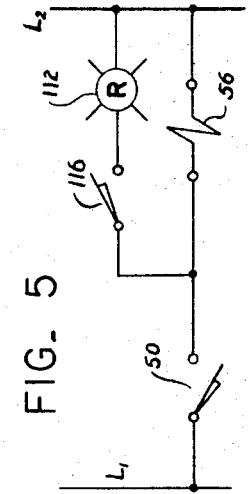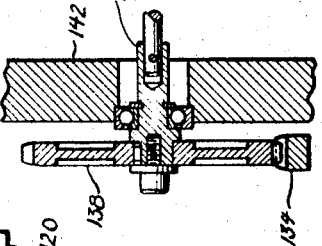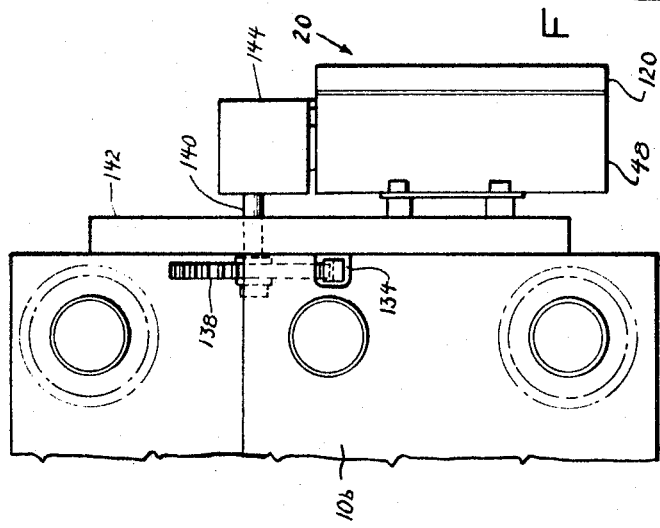

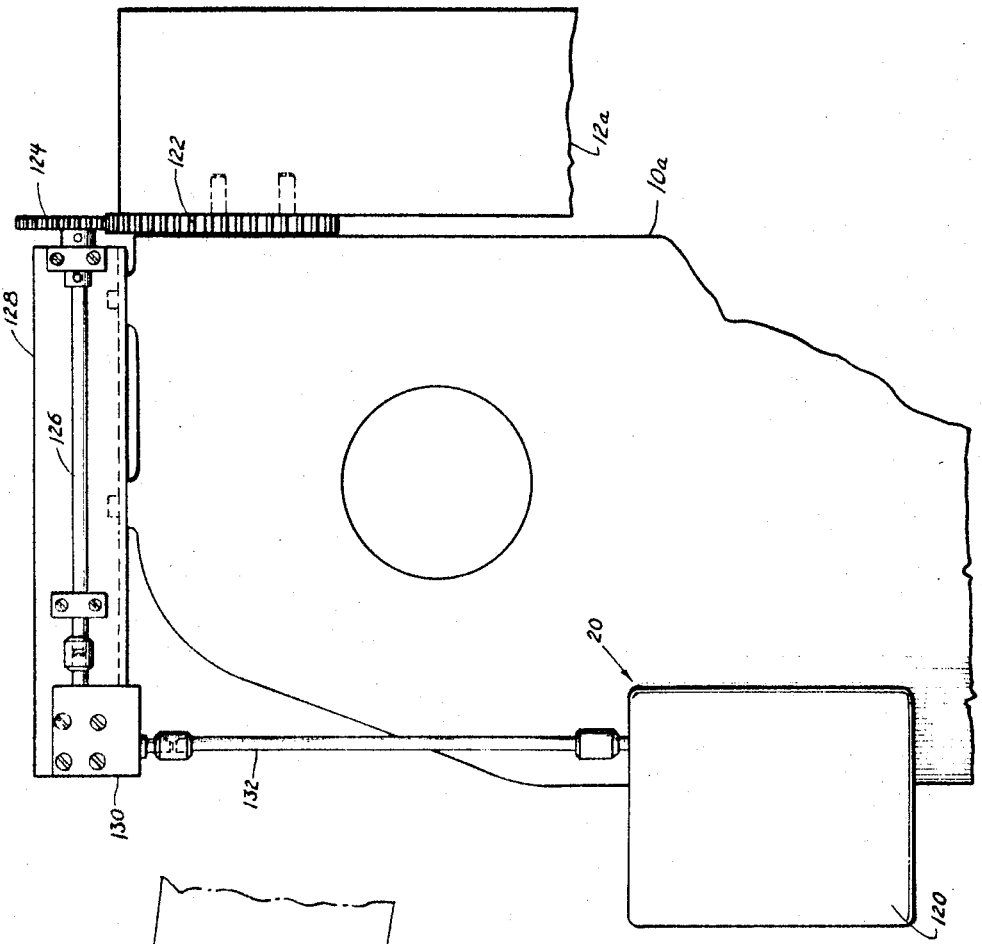
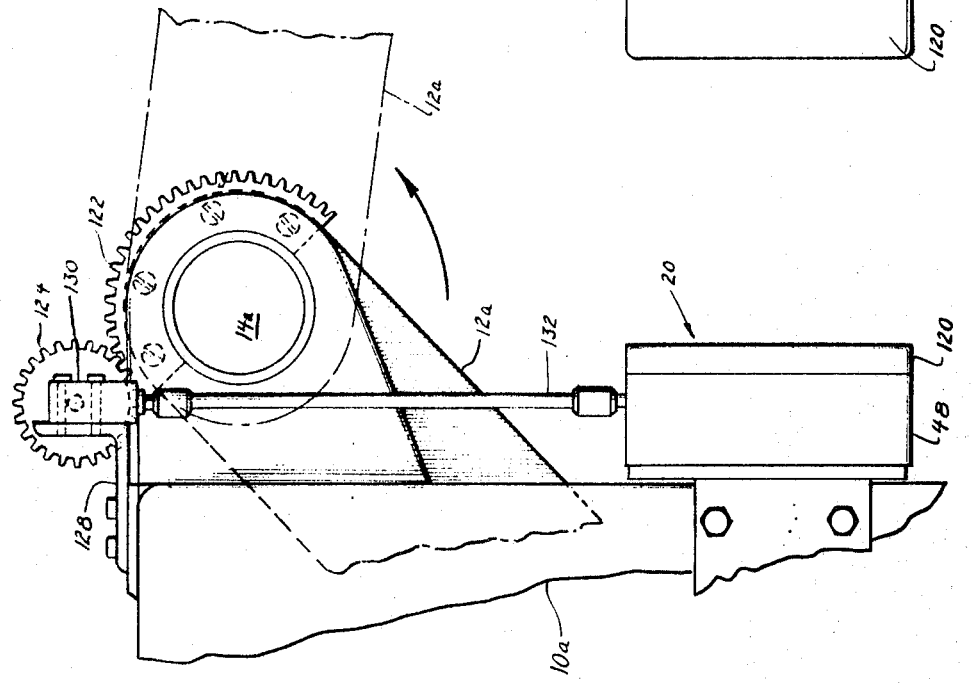

3,454,990
CONTROL SWITCH ACTUATING APPARATUS FOR A PLASTIC INJECTION MOLDING MACHINE OR THE LIKE
Harvey H. Collins, North Wilbraham, Mass., assignor to Package Machinery Company, East Longmeadow, Mass., a corporation of Massachusetts
Filed Aug. 12, 1966, Ser. No. 572,010
Int. Cl. B29f 1/00
U.S. Cl. 18—30                                   8 Claims

ABSTRACT OF THE DISCLOSURE

A control switch actuator for a plastic injection molding machine wherein a bank of switches are operated by a plurality of cams on a single camshaft. The camshaft is rotated responsive to movement of a pivoted link in the molding machine. The cams are locked in adjusted rotated position on the camshaft by a locking means exerting axial force, but when the locking means is released each cam can be adjusted independently and not cause rotation of the other cams due to spring means exerting axial force on the cams.

---

This invention relates to an apparatus for actuating a plurality of switches in the control circuitry of a plastic injection molding machine or the like wherein one or more of the switches must be actuated at each of several distinct positions of the machine's movable die, or other element movable with the die in order to achieve automatically timed control of the several operations performed in the machine during a cycle of reciprocation of the movable die member.

As suggested above, there are several distinct operations performed in a plastic injection molding machine in a sequence which is determined and timed by movement of the movable die through several distinct positions during a cycle of reciprocation. Therefore, it is a common practice to mount control switches at various locations on the machine so that they can be engaged and actuated in proper sequence by suitable means carried by the movable die or some element movable therewith or responsive to such movement. These control switches are, of course, connected in the electrical circuitry which controls the various machine operations.

In setting up the machine for automatic control, it is necessary for the operator or mechanic to locate the die in each of a plurality of positions and then to leave the operating station and locate or adjust at least one control switch on the machine for actuation at each distinct position of the movable die. This is a time-consuming task which often involves complicated and expensive wiring. Further, much of this set-up operation is impermanent. That is, whenever the dies are changed on the machine to produce a different part, it is necessary to make a new set-up for actuation of many if not all of the control switches.

It is the general object of this invention to provide a control switch actuating apparatus for a plastic injection molding machine or the like wherein the control switches are all collected in one area convenient to the operator station so as to reduce the time and wiring complications of set-up.

It is a more specific object of the invention to provide such an apparatus wherein the control switches and their wiring need not be relocated with each new machine set-up.

A still further specific object of the invention is to provide such an apparatus wherein the plurality of switches are actuated by a plurality of cams carried on a common camshaft and wherein one or more of the said cams can be adjusted on the shaft very easily and without disturbing the adjustment of the remaining cams.

As will be more fully described hereinafter, the control switch actuating apparatus of the present invention comprises a frame which supports the plurality of switches in a bank, and this frame rotatably mounts a camshaft adjacent the bank of switches. A plurality of cams are rotatably adjustably mounted on the camshaft for rotation therewith to engage and actuate the switches, and the camshaft is rotated by a driver which is connected either directly, but preferably indirectly, with the movable die member.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a vertical transverse sectional view taken through a part of a plastic injection molding machine to show the general arrangement of the control switch actuating apparatus of the present invention;

FIG. 2 is a longitudinal vertical sectional view taken through the machine of FIG. 1 to further illustrate the general arrangement of the apparatus on the machine;

FIG. 5 is a wiring diagram showing the circuitry for an indicator light forming a part of the switch actuating apparatus and showing an exemplary control circuit;

FIG. 6 is a view generally similar to FIG. 2, but illustrating an alternative form of driver for the actuating apparatus;

FIG. 7 is another view showing the general arrangement of the apparatus with the driver illustrated in FIG. 6;

FIG. 8 is a vertical end view of a portion of a plastic injection molding machine showing the general arrangement of the apparatus utilizing another alternative driver;

FIG. 9 is a vertical side view of the apparatus as shown in FIG. 8; and

FIG. 10 is an enlarged vertical cross-sectional view showing a detail of construction and taken as indicated generally by the line 10—10 of FIG. 9.

Figure 3:
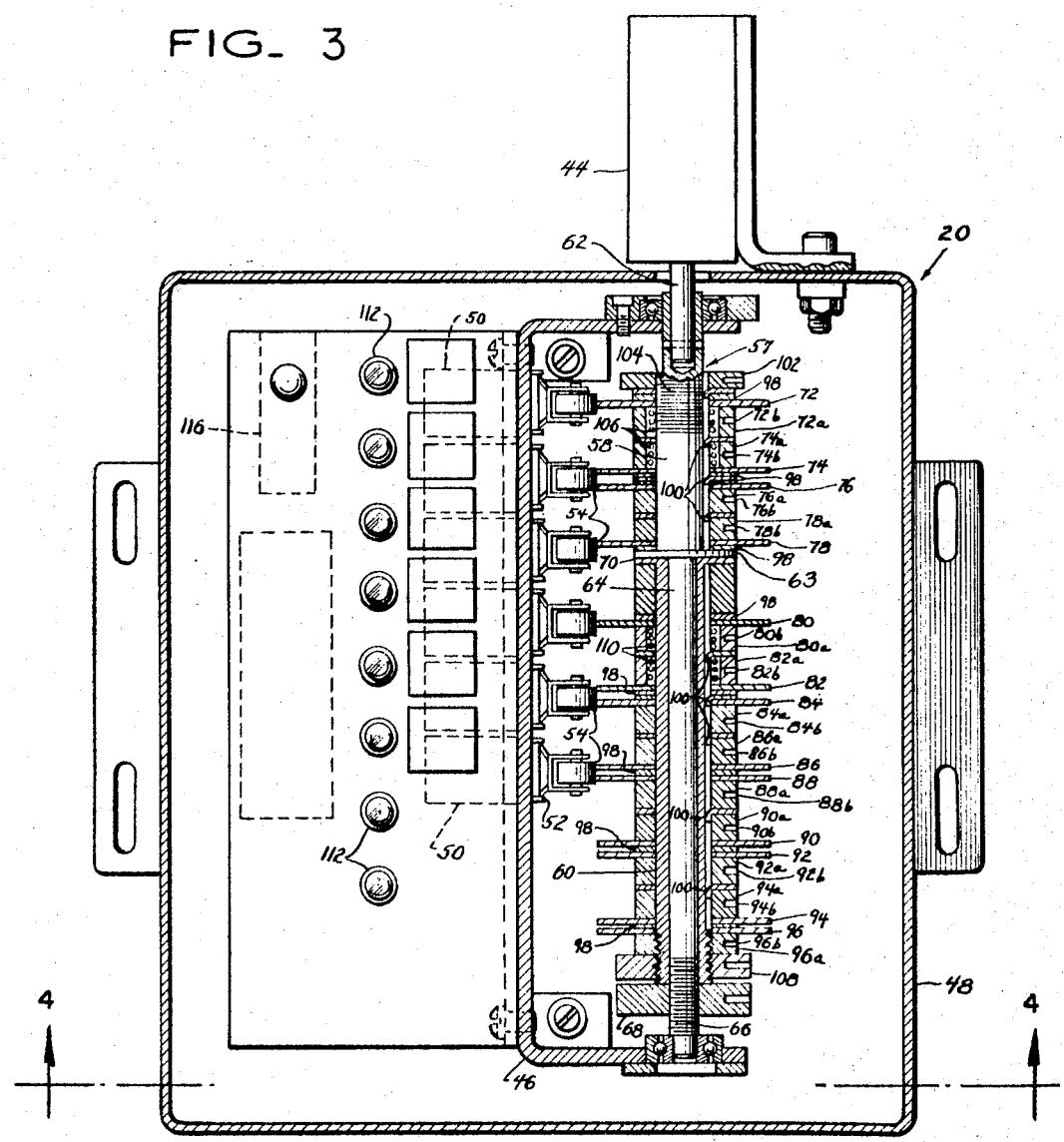
FIG. 3 is an enlarged vertical sectional view taken through the control frame or panel forming a part of the apparatus.

There is shown in FIG. 1 a portion of a vertical stock 10 which forms a part of a plastic injection molding machine, this stock being supported transversely of the machine on its bed or frame. As fully described in my copending U.S. application, Ser. No. 559,861, filed June 23, 1966, on Operating Linkage for a Plastic Injection Molding Machine or the Like, the movable die of the machine is reciprocated horizontally by mechanism including an operating link 12 (FIG. 2) which is pivotally connected to the stock 10 at a pivot pin or shaft 14. Thus, the link 12 pivots relative to the stock 10 as the movable die reciprocates, and for each position of the said movable die there is a corresponding pivoted position for the link 12.

In keeping with the present invention, the apparatus for actuating the control switch in timed sequence comprises a driver 16 which is operatively associated with the link 12, a motion transmitting means 18 connected with the said driver and also connected with a control box 20 as will be more fully described hereinafter.

The form of driver shown in FIGS. 1 and 2 comprises a drive chain 22 having its ends secured to the link 12 as indicated at 24, 24 to cause movement of the said chain along its length as a result of pivotal movement of the link 12 on its pivot axis or shaft 14. As best shown in FIG. 2, the chain 22 extends over an idler sprocket 26 and then around a driven sprocket 28 which is keyed to a transfer shaft 30, and then the chain 22 extends over a second idler sprocket 32 in its return to the link 12. Thus, as the link 12 is pivoted, the driven sprocket 28 and transfer shaft 30 are rotated clockwise or counterclockwise with the link 12. As also seen in FIG. 2, the transfer shaft is mounted on a spring-biased bracket 34 secured to the stock 10.

The transfer shaft 30 also has a second sprocket 36 mounted thereon and keyed thereto, and this sprocket constitutes the drive sprocket of the motion transmitting mechanism 18. Said motion transmitting mechanism includes an endless chain 38 which is entrained over the sprocket 36 and a driven sprocket 40 which is keyed to a horizontal shaft 42. The horizontal shaft 42 extends into a gear box 44 on top of the control box 20 and it contains suitable bevel gearing or the like to drive a vertically disposed camshaft which extends into the control box 20 as will be described.

Figure 4:
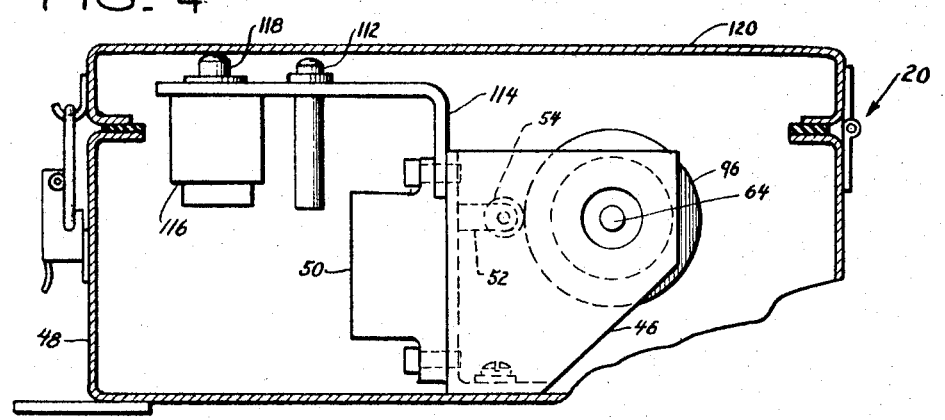
FIG. 4 is a horizontal sectional view taken through the said frame or control panel as indicated by the line 4—4 of FIG. 3.

Turning now to the control box, as is best shown in FIGS. 3 and 4, it will be seen that this includes a two-piece frame and housing wherein the frame element is identified by the reference number 46 and the housing element is identified by the reference 48. The frame element 46 supports a plurality of control switches 50, 50 (six are shown) which may be in the form of limit switches but which in any event include plunger elements 52, 52 having rollers 54, 54 mounted thereon. In this form of switch, when the rollers are engaged as by a cam or the like, they depress the plungers to actuate the switches, either to open them or to close them as the circuitry provides. For example, one such control switch 50 may be connected in series as shown in FIG. 5 to energize a solenoid 56 which will operate an hydraulic valve controlling an operation of the plastic injection molding machine.

The two-piece frame 46 also rotatably supports a camshaft which is indicated generally by the reference number 57 and which includes a main shaft 58 and a secondary shaft 60. The main shaft 58 is coaxially connected or pinned to the output shaft 62 which extends vertically downwardly from the gear box 44 and which is driven through the gear box by the horizontal shaft 42. The said main shaft has an intermediate radial flange 63 and a reduced diameter lower end portion 64 which telescopically receives the hollow secondary shaft 60.

The main and secondary shafts 58 and 60 comprising the camshaft 57 are connected together by releasable securing means. That is, the reduced diameter lower end portion 64 of the main shaft 58 is threaded as indicated at 66 to receive a nut 68 which exerts an upwardly directed axial force against the secondary shaft 60 which is provided with a flange 70 at its upper end to engage the flange 63 on the main shaft 58, thus firmly to secure the main shaft 58 and secondary shaft 60 together for rotation as a unit. The composite camshaft 57 is shown to mount a series of some thirteen radial cams, four of which, comprising the cams 72, 74, 76, and 78 are secured directly to the main shaft 58 at the upper larger diameter end portion thereof and the remaining nine of which, comprising the cams 80–96, are secured directly to the secondary or sleeve shaft 60. The upper four cams 72, 74, 76, and 78 are located to engage the uppermost three switch rollers 54, 54 as shown in FIG. 3, and the next lower cams 80, 82, 84, 86 and 88 engage the next lower three switch rollers 54, 54 while the four bottom cams 90, 92, 94, and 96 are not shown to engage any switch but are available for use with the addition of more switches.

The adjacent cams are separated by spacers, and, preferably, these spacers constitute hubs cemented or otherwise secured to the cams to rotate therewith. Also, each hub-spacer is provided with a spanner wrench opening to facilitate turning the hub and thus rotatably adjusting the position of the associated cam on the camshaft. For convenience of illustration, each spacer hub associated with a cam is given the same number as the cam with the suffix $a$ added thereto and its spanner wrench opening is identified with the same number but with the suffix $b$ added.

In addition to the cams and their spacer hubs, there are a plurality of annular friction pads 98, 98 and lock washers 100, 100 spaced along the camshaft 56 to retard rotation of the said cams on the camshaft and to prevent inadvertent rotation thereof. Thus, the cams are to be rotated only deliberately by manual operation relative to the camshaft. To this end, each of the lock washers has a tab which is received along a spline provided either in the main shaft 58 or in the associated secondary shaft 60.

It will be understood that each cam is rotatably adjusted on the camshaft to engage and operate its associated switch whenever the movable die is in a distinct position calling for operation of the said switch. This adjustment of the upper cams 72, 74, 76, and 78 is achieved by loosening a lock nut 102 which is normally engaged with a threaded upper end portion 104 on the main shaft 58 to provide an axial force against the said cams and interposed spacers between said lock nut and the flange 63 on the said main shaft. When the locking means or nut 102 is released, any one or all of the said cams can be manually rotatably adjusted on the main shaft 58. When only one cam is rotated by means of its spacer hub, no motion is transferred to the adjacent cams, this being prevented by the lock washers 100, 100. Also, a pair of springs 106, 106, which cooperate to engage the adjacent cams 72 and 74, provide sufficient axial force on the friction pads 98, 98 to prevent accidental rotation of one cam with another, thus to retain all of the four cams in the upper series against inadvertent or undesirable rotation on the main shaft while one of them is being manually rotated.

Whenever one or more of the cams in the lower series comprising the nine cams numbered 80 to 96 needs adjusting, a locking nut 108 which is secured to the threaded lower end portion of the secondary shaft 60 is loosened to permit rotation of the said one or more cams in the lower series. Here again the lock washers 100, 100 and a pair of springs 110, 110, which are provided between the cams 80 and 82, prevent inadvertent rotation of cams in the series which are not being manually rotated or adjusted on the camshaft. When the lock nut 108 is tightened, it applies a relatively great axial force between itself and the flange 70 on the upper end of the secondary shaft to prevent undesirable rotation of the lower series of cams relative to the secondary shaft 60 and thus to the composite camshaft 56.

At this point it should be noted that in a plastic injection molding machine set-up, the aforementioned upper series of cams on the main shaft 58 are set to operate their associated switch 50, 50 when the movable die is moving in one horizontal direction, for example, the die closing direction, which causes rotation of the camshaft 56 in one direction, which may be clockwise. The lower series of cams on the secondary or sleeve shaft 60 are set to operate their switches on the opening stroke of the movable die, which causes counterclockwise rotation of the camshaft 56. After initial set-up, the cams in the upper series require only very infrequent minor adjustment for substantially all operations of the molding machine, and it is an advantage to be able to adjust all of the cams in the lower series as a whole relative to the upper series to adjust the length of the opening stroke of the die. This advantage is obtained with this construction by loosening the retaining nut 68 and turning the secondary shaft 60 and lower series of cams as a unit relative to the main shaft 58.

It will be understood that in the set-up operation, the movable die member will be placed in the position desired for operation of a switch. Then, either the lock nut 102 or the lock nut 108 is loosened, depending upon whether the cam to be adjusted is in the upper series on the main shaft or in the lower series on the secondary shaft, and the appropriate cam is rotatably adjusted on the camshaft to engage the plunger roller 54 for the appropriate switch 50 which is to be operated when the movable die is in the position set.

A visual indication is provided to show when the appropriate switch is actuated by adjustment of the cam. That is, there is an indicator light or lamp 112 supported on a bracket 114 extending from the frame 46 in association with each switch 50. Each such lamp 112 is connected in series with its associated switch 50 and with a normally closed limit switch 116 which is used in all such indicator light circuits. When a cam is adjusted to close its associated switch 50, the circuit is completed through the normally closed limit switch 116 to light the lamp 112, thus giving an indication that the cam is properly positioned or adjusted to operate the control switch 50 whenever the die returns to the position at which it is set.

However, the indicator lamp 112 is not lighted or energized each time the die returns to the set position during a cycle of operation. That is, the normally closed limit switch 116 is supported on the bracket 114 so that an operating plunger 118 thereon can be engaged to open the said limit switch whenever a cover 120 is closed as shown in FIG. 4 on the two-piece frame and housing 46, 48 to complete the control box 20. More specifically, the closed cover 120 holds the normally closed limit switch 116 open during routine automatic operation of the machine.

In the alternative structure shown in FIGS. 6 and 7, the apparatus of the invention is essentially the same, but a different driver and motion transmitting means are employed. As shown in these figures, a stock 10a pivotally supports a link 12a as in the first embodiment, but the driver element comprises a gear segment 122 which is secured to the link to pivot therewith on the axis of the link shaft 14a.

The segment 122 engages a pinion 124 which is keyed to a shaft 126 rotatably supported by a bracket 128 on top of the stock 10a. The pinion shaft 126 extends into a gear box 130 having an output shaft 132 which extends to the control box 20 and is connected to the camshaft 56 as in the first form described.

The alternative form shown in FIGS. 8, 9 and 10 also differs from the original only in the construction of the drive and motion-transmitting means. In this form, the drive element comprises an elongated rack 134 which is secured for movement with a cross-head 136. The said cross-head, as shown in my co-pending application, forms an element of the movable die operating linkage system and it reciprocates horizontally in effecting horizontal reciprocation of the movable die. Thus, the rack 134, which extends horizontally from the cross-head 136 toward the machine stock 10b, also reciprocates horizontally with the movable die.

The rack 134 engages a pinion 138 which is connected with a shaft 140 rotatably supported by a plate 142 which is secured to the side of the stock 10b. The pinion shaft 140 extends through the plate 142 into a gear box 144 having an output shaft which extends into the control box 20 and is connected with the camshaft as in the first-described embodiments.

The invention claimed is:
1. Apparatus for actuating a plurality of switches in the control circuitry of a machine which includes a movable element and wherein the switches are to be actuated in a sequence determined by various distinct positions of the said element when moving through a cycle of machine operation, said apparatus comprising a frame supporting said switches in a blank, a camshaft rotatably supported by said frame adjacent said blank of switches, a plurality of cams rotatably adjustably mounted on said camshaft for rotation therewith for engagement with and thereby causing actuation of said switches, a driver connected with said movable element for operation responsive to movement thereof, motion transmitting mechanism interconnecting said driver and camshaft to rotate the latter with movement of said element, a plurality of spacers interposed between said cams to maintain an axially spaced relationship therebetween, releasable locking means to exert an axial force on said spacers and cams to prevent rotation of any of said cams relative to said camshaft, and a spring means to exert a lesser axial force on said spacers and cams to permit manual rotation of one cam relative to the camshaft while preventing such rotation of the remaining cams with said locking means released.

2. Actuating apparatus as set forth in claim 1 wherein an indicator light and a normally closed limit switch are connected in series circuit with at least one of said switches whereby to indicate proper adjustment of an associated one of said cams to engage and actuate said one switch at a distinct position of said movable element, and wherein a normally closed cover is provided for said frame to engage and hold said limit switch open when the said cover is closed.

3. Control switch actuating apparatus as defined in claim 1 wherein said camshaft comprises a main shaft and a secondary shaft telescopically supported over a portion of the main shaft, releasable securing means is provided to prevent relative rotation between said main and secondary shafts, a first series of said plurality of cams is rotatable on said main shaft, a second series of said plurality of cams is rotatable on said secondary shaft, the plurality of spacers are interposed between all of said cams to maintain an axially spaced relationship therebetween, and wherein said releasable locking means includes a first releasable locking means to exert an axial force on the first series of cams and interposed spacers to prevent rotation thereof relative to said main shaft, and a second releasable locking means to exert an axial force on the second series of cams and interposed spacers to prevent rotation thereof relative to said secondary shaft.

4. The actuating apparatus of claim 3 wherein said spring means includes a first spring to exert an axial force on the first series of cams and interposed spacers to permit manual rotation of one cam thereof while preventing rotation of the others relative to the main shaft with said first locking means released, and a second spring to exert an axial force on the second series of cams and interposed spacers to permit manual rotation of one cam thereof while preventing rotation of the others relative to the secondary shaft with said second locking means released.

5. Apparatus for actuating a plurality of switches in the control circuitry of a plastic injection molding machine of a type having a movable die and linkage elements including a pivotally supported link for reciprocating the die and wherein the switches are to be actuated in a sequence determined by various distinct positions of the die when moving through a cycle of reciprocation, said apparatus comprising a frame supporting said switches in a bank, a camshaft rotatably supported by said frame adjacent said bank, a camshaft rotatably supported by said frame adjacent said bank of switches, a plurality of cams rotatable on said camshaft, a plurality of spacers interposed between said cams to maintain an axially spaced relationship therebetween, releasable means for locking said cams in adjusted rotated positions on said camshaft by the application of an axial force whereby the cams engage and actuate said switches in sequence during rotation of the camshaft, a driver connected to said pivotally supported link for operation responsive to movement of said die, and motion transmitting mechanism interconnecting said driver and camshaft to rotate the latter with reciprocation of the die.

6. An apparatus as set forth in claim 5 wherein said driver comprises a chain having its ends connected to said pivotally supported link and entrained over a sprocket to rotate the sprocket during pivotal movement of the link, and wherein said sprocket forms a part of said motion transmitting mechanism.

7. An apparatus as set forth in claim 5 wherein said driver comprises a gear segment mounted on said pivotally supported link and engaging a pinion, and wherein said pinion forms a part of said motion transmitting mechanism.

8. The apparatus as defined in claim 5 wherein an indicator light and a normally closed limit switch are connected in series circuit with at least one of said switches to indicate proper adjustment of an associated one of said cams to engage and actuate said one switch at a distinct position of said die, and wherein a normally closed cover is provided for said frame to engage and hold said limit switch open when the cover is closed.

References Cited

UNITED STATES PATENTS

| | | |
|---|---|---|
| 2,111,857 | 3/1938 | Jeffery. |
| 2,523,137 | 9/1950 | Nichols et al. |
| 3,104,298 | 9/1963 | Aldous _____ 74—568 X |
| 3,221,117 | 11/1965 | Simmons _____ 74—568 X |
| 3,242,764 | 3/1966 | Benaman et al. _____ 74—568 |
| 3,251,242 | 5/1966 | Gustin _____ 74—568 |
| 3,285,095 | 11/1966 | Rockola _____ 74—568 |
| 3,372,708 | 3/1968 | Hotchkin _____ 74—568 |

FOREIGN PATENTS

| | | |
|---|---|---|
| 1,247,323 | 10/1960 | France. |
| 871,845 | 7/1961 | Great Britain. |

WILBUR L. McBAY, Primary Examiner

U.S. Cl. X.R.

74—568; 192—142